Sept. 23, 1952  E. L. KEENE ET AL  2,611,187
KEYWAY LOCATION GAUGE
Filed June 28, 1949  2 SHEETS—SHEET 1

INVENTORS
Edward L. Keene and
Dan C. Griffin
BY Mason, Fenwick & Lawrence
ATTORNEYS Sept. 23, 1952     E. L. KEENE ET AL     2,611,187
KEYWAY LOCATION GAUGE Filed June 28, 1949     2 SHEETS—SHEET 2

INVENTORS
Edward L. Keene and
Dan C. Griffin
BY Mason, Fenwick & Lawrence
ATTORNEYS Patented Sept. 23, 1952

2,611,187

UNITED STATES PATENT OFFICE 2,611,187

KEYWAY LOCATION GAUGE

Edward L. Keene, Houston, Tex., and Dan C. Griffin, Shreveport, La.

Application June 28, 1949, Serial No. 101,864

5 Claims. (Cl. 33—180)

This invention relates to an improvement in gauges for measuring the width and relationship between the center line of a keyway, slot or spline, with respect to the axis of a shaft on which the slot or spline is located.

In machining operations, the process of determining the proper relationship between the keyway or spline and the center of the shaft is ordinarily an involved procedure requiring a considerable amount of time. This is true because there has heretofore been available no gauge capable of providing an immediate and spontaneous check on the relation of an axis of a keyway to the axis of a shaft in which it is cut. Notwithstanding the lengthy inspection procedure required in determining this relationship, involving a very considerable loss of time and expenditure of energy, it is mandatory that this inspection be performed (a) when the machine tool is being "set up" and the relationship is being set for the machining of the shafts involved; (b) whenever cutters are changed; (c) when "final" inspections are made as a "double check" before the pieces are sent to the assembly line; and (d) at periodic intervals throughout the day where the machine tool is in continuous operation to assure that the relationship remains unchanged.

Accordingly, the primary object of the present invention is to reduce the time loss in the usual machining operations when cutting keyway or splines on shafts.

Another object is to provide a novel and improved gauge for measuring the width and relationship of the center line of slots or splines with respect to the axis of the shaft.

Another object is to provide an improved gauge of the type described in which the "feeler" gauge for checking the width of the slot is a part of the gauge for measuring the relationship between the slot or spline and the shaft.

Other and further objects will become readily apparent from the following description when considered in connection with the accompanying drawings, illustrating an embodiment of the invention, and in which.

Figure 1:
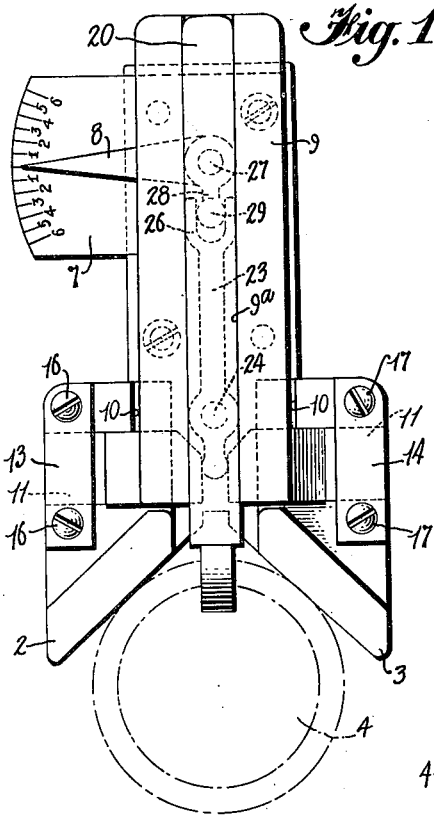
Figure 1 is a front elevation of an improved gauge in accordance with the present invention.
Figure 2:
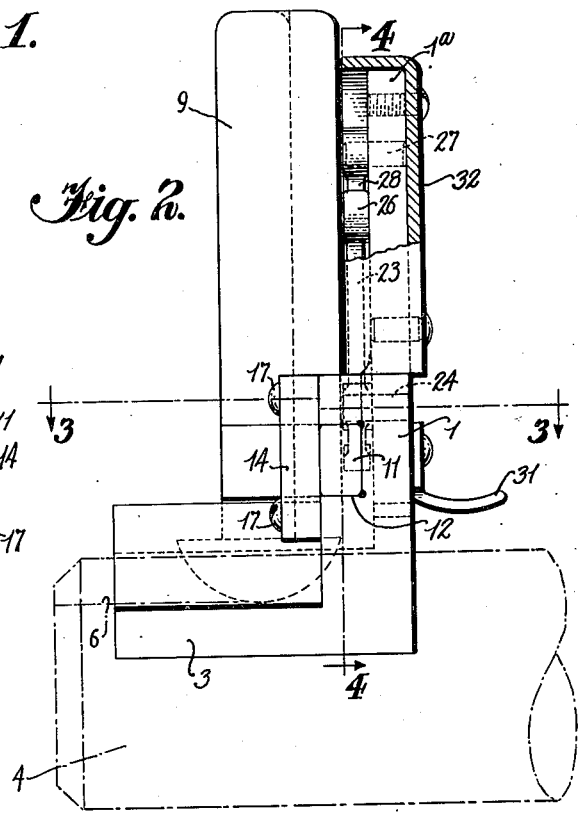
Figure 2 is a side elevation of Figure 1.

Briefly stated, the invention comprises a gauge having a main body portion, the lower end of which is provided with what might be termed an inverted V-block, the sides of the block being very accurately machined and positioned with respect to each other so that when the V-block rests upon the surface of a shaft the apex of the V-block will be precisely parallel with the axis of the shaft, it being assumed, of course, that the shaft is accurately machined. This V-shaped block constitutes a reference element with respect to which the axis of the slot or spline can be determined. To this end an element slidably engages the main body, the latter element being adapted to receive a width gauge of the exact desired width of the slot so that when the V-block is firmly pressed against the shaft and the slot gauge engages the slot, any relative movement between the body and the element carrying the width gauge will give an indication of the misalignment between the axis of the slot and the axis of the shaft. Instead of a width gauge for measuring the width of a slot, a width gauge for measuring the width of a spline can be substituted for measuring the misalignment between splines and the axis of the shaft.

Referring specifically to the drawings showing an illustrative embodiment of the invention, the gauge comprises a main body 1, the underside of which is provided with right and left-hand blocks 2 and 3. The under surfaces of these blocks are very accurately machined and the surfaces thereof are arranged at an angle of approximately ninety degrees in the illustrated embodiment. However, the exact angle between the under surfaces of the blocks is not extremely critical except that it will be readily apparent that the smaller the angle between the planes of the surfaces, the less likelihood there is for misalignment between the blocks and the axis of the shaft 4 in which it is desired to determine the relationship of a slot such as that indicated at 6. The body 1 is provided with an upstanding portion 1a on which is mounted a suitable dial 7 over which a pointer 8 moves to give an indication of the relationship between the slot or keyway and the axis of the shaft. The body 1 of the guide is provided with a suitable groove 10 which is adapted to receive a width gauge holding element 9, the latter being provided with transverse guiding ears 11 which are accurately machined and which fit into accurately machined transverse grooves 12 in the body 1. The ears 11 which constitute sliding guides for the element 9 are retained in the grooves 12 by means of suitable straps 13 and 14 which are secured in position by screws 16 and 17, respectively. It is to be noted that the groove 10 is slightly wider than the width of the width gauge holding element 9 to permit limited lateral relative movement. Since the ears 11 are accurately fitted into the grooves 12, it will be readily apparent that the element 9 can move only laterally with respect to the body 1 and no relative pivotal movement will be permitted.

The element 9 is provided with an accurately machined longitudinal groove 9a which is adapted to receive an accurately machined shank of a width gauge 20. This width gauge may be in the form of a Woodruff key which is commonly used to key gears and pulleys to shafts. It will be readily apparent from an inspection of the drawings that when the shank of the width gauge 20 is inserted in the accurately machined groove 9a of the element 9, and should the blocks 2 and 3 be held against the outer surface of the shaft, that any misalignment of the key slot 6 will cause the width gauge 20 to move laterally one way or the other with respect to the body 1. This relative movement would be a measure of the relative misalignment. In order to accurately indicate this relative movement, suitable linkage is provided between the element 9 and the pointer 8 for moving the latter.

Figure 4:
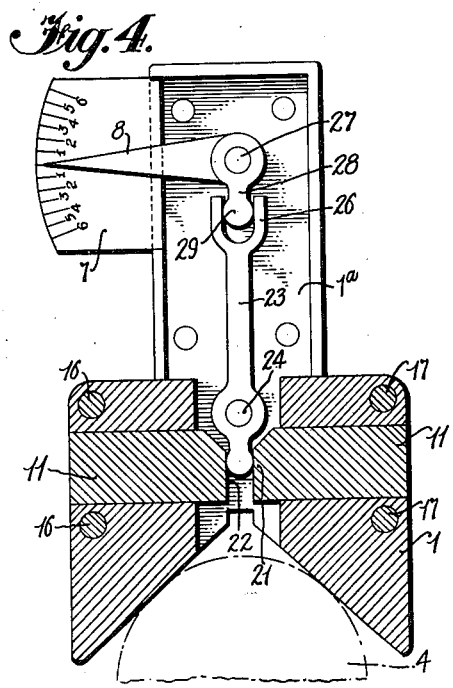
Figure 4 is a vertical section on line 4—4 of Figure 2.
Figure 3:
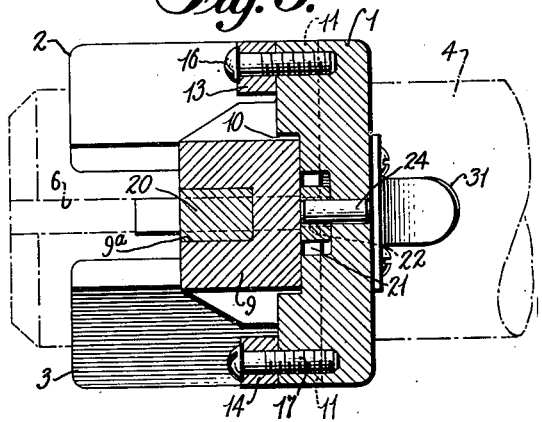
Figure 3 is a horizontal section on line 3—3 of Figure 2.

To this end, the element 9 is provided with a suitable boss 21 which is provided with an accurately machined and ground slot 22. The slot 22 is engaged by an accurately machined cylindrical end of an actuating lever 23. The lever 23 is pivoted by means of pin 24 to the upstanding portion 1a of the main body 1 and the upper end of the lever is provided with a suitable yoke 26, the inner surfaces of which are very accurately machined. The pointer 8 is pivoted at 27 to the upper end of the upstanding portion 1a and is provided with a suitable bell crank 28 which terminates in an accurately machined cylindrical or spherical enlargement 29. It will be readily apparent from inspection of Figure 4 that any relative movement between the ears 11 which constitute slides, and the main body 1 will cause the lever 23 to operate the pointer 8. The dial 7 is graduated in thousandths of an inch from either side of a central zero mark. The main body 1 is provided with a suitable finger rest 31 to assist an operator in holding the main body firmly against the shaft during measurements. It is believed from the foregoing description that it will be readily apparent that when the operator holds the V-blocks 2 and 3 against the outer surface of the shaft by means of the finger rest 31 and by clamping his fingers over the outer ends of the blocks 2 and 3 that an accurate indication of the misalignment of the keyway with respect to the axis of the shaft will be indicated by the dial and pointer. A suitable cover 32 is provided to protect the operating linkage and this cover is secured to the upstanding portion 1a by means of suitable screws.

Figure 5:
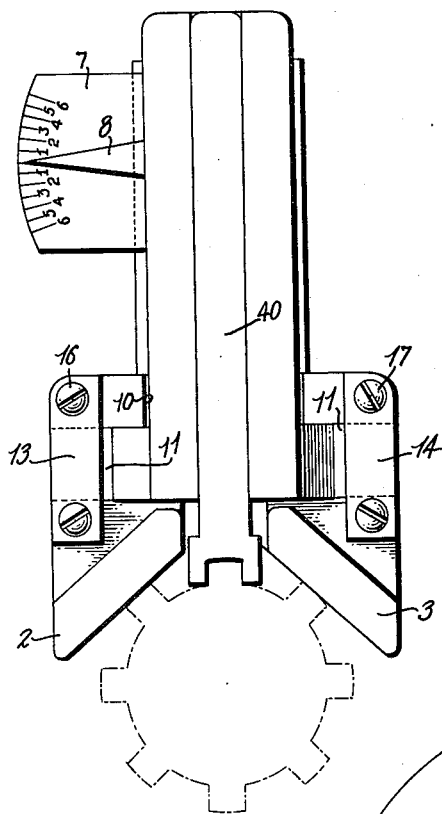
Figure 5 is a front elevation of a modified form of the invention for measuring the relationship between splines in the axis of a shaft.

In the modified form shown in Figure 5 the only difference is in the width gauge 40 for measuring the width of a spline. It will be noted that the lower end of the width gauge 40 is provided with an accurately machined slot of the depth and width to which it is desired that the splines be machined. It will be readily apparent that when the blocks 2 and 3 of the main body are placed against the surface of the splines of the shaft and the width gauge 40 engages an intermediate spline, any relative misalignment between the axis of the spline being measured and the axis of the shaft will be indicated on the dial in the manner previously described.

Figure 6:
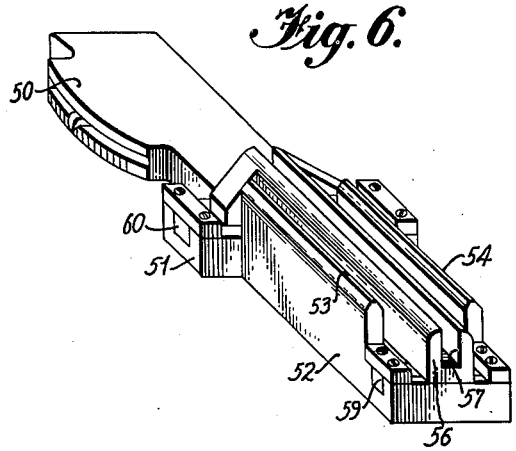
Figures 6 and 7 are perspective views of improved gauges made in accordance with the present invention for checking slots or splines in internal surfaces.
Figure 7:
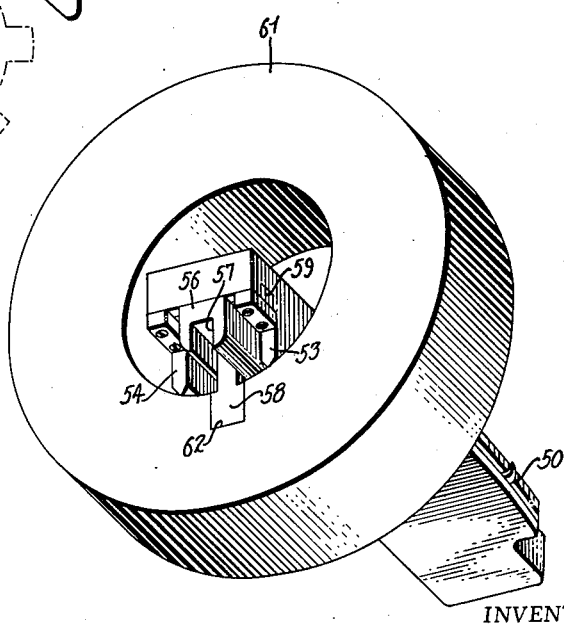

In the modified form shown in Figures 6 and 7, a form of gauge is illustrated which is adapted to determine any misalignment between the plane of the walls of the keyway or splines which might be machined in such internal surface. The basic principle of the device is identical with that of the previous modification. In the previous modifications the blocks 2 and 3 serve as the elements to effect a line contact with the convex surface of the shaft and in the present modification there has been appropriate means substituted for the blocks 2 and 3 for the purpose of effecting a line contact with the internal concave surfaces. Also the width gauge holding element has been modified accordingly.

This latter modified form utilizes an indicator mechanism 50, the mechanical equivalents of which have been previously described. The body 51 corresponding to the body 1 of the previous modifications is provided with an extension 52 having the elongated bosses 53 and 54. The upper surfaces of these bosses are very accurately machined and ground. The ground and finished surfaces are very narrow and their disposition is such that when applied to an internal concave surface they will effect line engagement therewith. These bosses serve the same purpose with respect to concave surfaces that the blocks 2 and 3 serve in connection with convex surfaces, namely, to fixedly orient the main body with respect to the axis of the concave internal surface. The width gauge holding element 56 of the present modification for concave surfaces corresponds to the element 9 of the previous modification which is adapted to hold gauges for making measurements with respect to the convex external surfaces of a shaft. The element 56 is provided with an accurately machined slot 57 which is adapted to receive the shank of a keyway gauge 58. The element 56 is adapted to be guided in the main body 51 in a manner similar to that described in connection with the previous modifications and to this end it is provided with suitable ears 59 and 60 which are slidable transversely of the main body 51 in suitable accurately machined guide slots. In Figure 6 the ears 59 and 60 are shown only on one side of the perspective view and it will be readily understood that there are similar ears and guide slots on the opposite side of the instrument.

Figure 7 illustrates the manner in which this modification is operated. The gauge is shown in the position to measure the relationship between the plane of the side walls of a keyway in the internal surface of a machine element 61 such as the hub of a gear or pulley. From this view it will be readily understood in the light of the previous description, that when the bosses 53 and 54 are held against the internal surface of the bore with the width gauge 58 engaging the slot 62, that any relative misalignment between the side walls of the slot and the axis of the bore will be indicated by the indicator mechanism 50.

In the specific embodiments described above, the means carried by the main body of the instrument for the purpose of positively positioning the main body with respect to the surface of an external shaft or the internal surface of a hub or gear, are shown as continuous surfaces. However, instead of the continuous surfaces, such as those on the blocks 2 and 3 and on the bosses 53 and 54, it will be readily apparent that spaced points which might be on these continuous surfaces or which are symmetrically arranged with respect to the main body will accomplish the same result, that is, positively orient the main body of the instrument with respect to the convex or concave surface.

Although the invention has been described in considerable detail, it will be apparent to those skilled in the art that many variations are possible without departing from the inventive concept. It is therefore desired that the invention not be limited except insofar as is made necessary by the prior art and by the appended claims.

What is claimed is:

1. An instrument for measuring the relative location between the longitudinal center line of longitudinal corrugations and the axis of a cylindrical shaft in which the longitudinal corrugations are cut, said instrument comprising a main body having supporting feet in the form of blocks, each block having a plane surface which intersects the plane surface of the other block, said supporting feet forming a cradle to straddle the cylindrical surface of the shaft and positively orient said body relative to the axis of said shaft, a slide element mounted on said body for rectilinear transverse movement with respect thereto, a gauge element carried by said slide element and having a contact portion formed thereon to snugly interfit one of the longitudinal corrugations on the shaft and indicator means intercoupled between said body and said slide element for indicating the relative movement between said slide element and said main body.

2. An instrument for measuring the relative location between the longitudinal center line of longitudinal surface corrugations and the axis of a cylindrical shaft having such corrugations, said instrument comprising a main body having supporting feet, each of said supporting feet having plane surfaces, the planes of said surfaces being disposed in intersecting relation with each other and each of said surfaces forming line contact with the cylindrical surface of the shaft when firmly held in engagement therewith, to fixedly orient said body with respect to the axis of said surface, an element slidably mounted on said main body for rectilinear movement transversely of the plane surfaces of said feet, a gauge mounted on said slide element for rectilinear longitudinal movement relative thereto having a contact portion projecting between said plane surface to snugly interfit one of said longitudinal corrugations, and indicator means intercoupled between said body and said element for indicating the relative rectilinear movement between said element and said main body.

3. The combination as set forth in claim 2 in which said indicator means comprises a pivoted indicator arm on said body having a projection intercoupled with said element for pivotal movement proportional to transverse movement of said element relative to the intersection of said plane surfaces, and scale means on said body adjacent said indicator arm for indicating the position of the longitudinal center line of the longitudinal corrugation interfitted with said contact portion of said gauge and the axis of said cylindrical surface.

4. An instrument for measuring a relative location between the longitudinal center line of longitudinal corrugations and the axis of a cylindrical surface in which the longitudinal corrugations are formed, said instrument comprising, a main body forming supporting feet, each of said supporting feet forming a cradle to straddle the corrugations in the cylindrical surface and establish line contact therewith to positively orient said body relative to the axis of said cylindrical surface, a slide element mounted on said body for rectilinear transverse movement with respect thereto, a gauge element carried by said slide element and having a contact portion formed thereon to snugly interfit one of the longitudinal corrugations on the shaft, and indicator means intercoupled between said body and said slide element for indicating the relative movement between said slide element and said main body.

5. An instrument for measuring the relative location between the longitudinal center line of longitudinal surface corrugations and the axis of a concave cylindrical surface in which the longitudinal corrugations are cut, said instrument comprising a main body having supporting feet in the form of elongated bosses each having elongated V-shaped contact surfaces, said supporting feet forming a cradle to straddle the corrugations in said concave cylindrical surface to establish line contact with the surface and positively orient said body relative to the axis of said cylindrical surface, a slide element mounted on said body for rectilinear transverse movement with respect thereto, a gauge element carried by said slide element and having a contact portion formed thereon to snugly interfit one of the longitudinal corrugations on the shaft, and indicator means intercoupled between said body and said slide element for indicating the relative movement between said slide element and said main body.

EDWARD L. KEENE.
DAN C. GRIFFIN.

REFERENCES CITED

The following references are of record in the file of this patent:

UNITED STATES PATENTS

| Number | Name | Date |
|---|---|---|
| 1,250,586 | Johnson | Dec. 8, 1917 |
| 1,401,119 | Aldeborgh | Dec. 27, 1921 |
| 1,486,667 | Jerman | Mar. 11, 1924 |
| 1,597,636 | Sykes | Aug. 24, 1926 |
| 1,642,077 | McIntosh | Sept. 13, 1927 |
| 2,523,277 | Campbell | Sept. 26, 1950 |

FOREIGN PATENTS

| Number | Country | Date |
|---|---|---|
| 474,098 | Germany | Mar. 26, 1929 |
| 542,571 | Great Britain | Jan. 15, 1942 |